United States Patent [19]
Meyers et al.

[11] Patent Number: 6,062,178
[45] Date of Patent: May 16, 2000

[54] METHOD OF OPERATING UNI-FLOW TWO-CYCLE ENGINE DURING REDUCED LOAD CONDITIONS

[75] Inventors: David P. Meyers, San Antonio; John C. Hedrick, Boerne; Gary D. Bourn; John T. Kubesh, both of San Antonio, all of Tex.; Kevin D. Beaty, Fort Collins, Colo.; Robert W. Burrahm, San Antonio, Tex.

[73] Assignee: Southwest Research Institute, San Antonio, Tex.

[21] Appl. No.: 09/082,282

[22] Filed: May 20, 1998

[51] Int. Cl.[7] .............................. F02B 75/02; F02B 25/04; F02B 33/32; F02D 9/08
[52] U.S. Cl. ............................. 123/65 VC; 123/65 BA; 123/336; 123/337; 60/315; 60/611
[58] Field of Search .................. 60/315, 611; 123/559.1, 123/559.3, 65 BA, 65 VC, 336, 337, 592

[56] References Cited

U.S. PATENT DOCUMENTS

| | | | |
|---|---|---|---|
| 1,583,621 | 5/1926 | Steinberg | 60/597 |
| 1,826,638 | 10/1931 | Schwerdtfeger | 123/564 |
| 2,154,322 | 4/1939 | Cecil | 60/315 |
| 2,431,563 | 11/1947 | Johansson | 60/602 |
| 2,765,782 | 10/1956 | Cambeis et al. | 123/65 BA |
| 2,891,524 | 6/1959 | Scheiterlein | 123/65 BA |
| 2,924,069 | 2/1960 | Buchi | 123/65 BA |
| 3,042,015 | 7/1962 | Peterson | 123/592 |
| 3,116,596 | 1/1964 | Boehme et al. | 60/307 |
| 3,577,727 | 5/1971 | Warren et al. | 60/292 |
| 3,669,213 | 6/1972 | Mollere | 181/118 |
| 3,680,305 | 8/1972 | Miller | 123/337 |
| 3,941,035 | 3/1976 | Mueller | 92/49 |
| 4,062,332 | 12/1977 | Perr | 123/323 |
| 4,254,752 | 3/1981 | Friddell et al. | 123/323 |
| 4,437,311 | 3/1984 | Iwamoto et al. | 60/602 |
| 4,444,012 | 4/1984 | Gauffres | 60/602 |
| 4,466,248 | 8/1984 | Nartowaki | 60/602 |
| 4,995,354 | 2/1991 | Morikawa | 123/65 V |
| 5,079,921 | 1/1992 | McCandless et al. | 60/602 |
| 5,105,784 | 4/1992 | Davis et al. | 123/337 |
| 5,195,323 | 3/1993 | Lorts | 60/602 |
| 5,542,249 | 8/1996 | Heath | 60/293 |
| 5,568,800 | 10/1996 | Einaudi et al. | 123/592 |
| 5,638,797 | 6/1997 | Kim | 123/592 |

FOREIGN PATENT DOCUMENTS 325659  2/1930  United Kingdom ................ 60/315

*Primary Examiner*—Willis R. Wolfe
*Assistant Examiner*—Brian Hairston
*Attorney, Agent, or Firm*—Baker & Botts, L.L.P.

[57] ABSTRACT

A method of operating a two-cycle internal combustion engine under low load conditions. A throttle is placed at the intake air system to reduce air intake into the engine cylinders. A pump is placed in the exhaust system, such that it creates reduced pressure downstream of the exhaust valves. In this manner, when the air intake ports close, the exhaust is evacuated and the air trapped in the cylinder is reduced. This permits fuel to be reduced so that the engine may operate in a low load state without losing combustion.

18 Claims, 4 Drawing Sheets

METHOD OF OPERATING UNI-FLOW TWO-CYCLE ENGINE DURING REDUCED LOAD CONDITIONS

TECHNICAL FIELD OF THE INVENTION

This invention relates to internal combustion engines, and more particularly to operating a uni-flow two-cycle engine under part load conditions.

BACKGROUND OF THE INVENTION

In a two-cycle engine, the entire cycle of internal combustion events (intake, compression, power, and exhaust) takes place in two piston strokes. Every other piston stroke (the down stroke) is a power stroke.

Uni-flow scavenged two-cycle engines are characterized by air intake at the bottom of the piston cylinder. The air intake port opens as the piston nears the bottom of its down stroke and closes soon after the up stroke begins. The air flows up toward the top of the cylinder during the up stroke and exits through exhaust valves at the top of the cylinder. These exhaust valves open just before the intake port opens during the down stroke, and close just after the air intake on the up stroke. The flow of air up through the cylinder "scavenges" the exhaust gas via the exhaust valves.

In their conventional configuration, uni-flow two-cycle engines, particularly those using homogeneous combustion, have a limited ability to run at reduced loads. Unlike four-stroke engines, they do not have separate intake and exhaust strokes. Due to the lack of an intake stroke, the intake air cannot be throttled because it is used to scavenge the exhaust gas. To reduce power, fuel flow can be reduced to a limited extent, but after a point (the lean flammability limit), reduced fuel flow will result in lack of combustion.

SUMMARY OF THE INVENTION

One aspect of the invention is a method of operating a uni-flow two-cycle internal combustion engine at reduced loads. The engine is equipped with a throttle on the air intake and an evacuation pump in the exhaust system.

Light load conditions occur when the air intake is throttled. On the down stroke of a piston, the exhaust valves are opened and then the air intake ports are opened. On the up stroke of a piston, the intake air ports are closed, then the exhaust valves are closed. During the time the exhaust valves are open, the evacuation pump assists in evacuation of air from the piston chamber.

Under light loads, the exhaust evacuation ensures that the intake air pressure is sufficiently higher than the exhaust pressure so as to permit exhaust to exit the cylinder. Reduced pressure at the exhaust compensates for the reduced pressure at the air intake that results from throttling. In this manner, the amount of air trapped in the cylinder can be controlled and minimized. This permits air intake to be reduced so that fuel can also be reduced for a flammable air/fuel ratio.

DETAILED DESCRIPTION OF THE INVENTION

The invention described below is directed to uni-flow two-cycle engines and a method of operating them at reduced loads. As explained below, power may be modulated by throttling intake air and evacuating the exhaust with an exhaust evacuation device.

Figure 1:
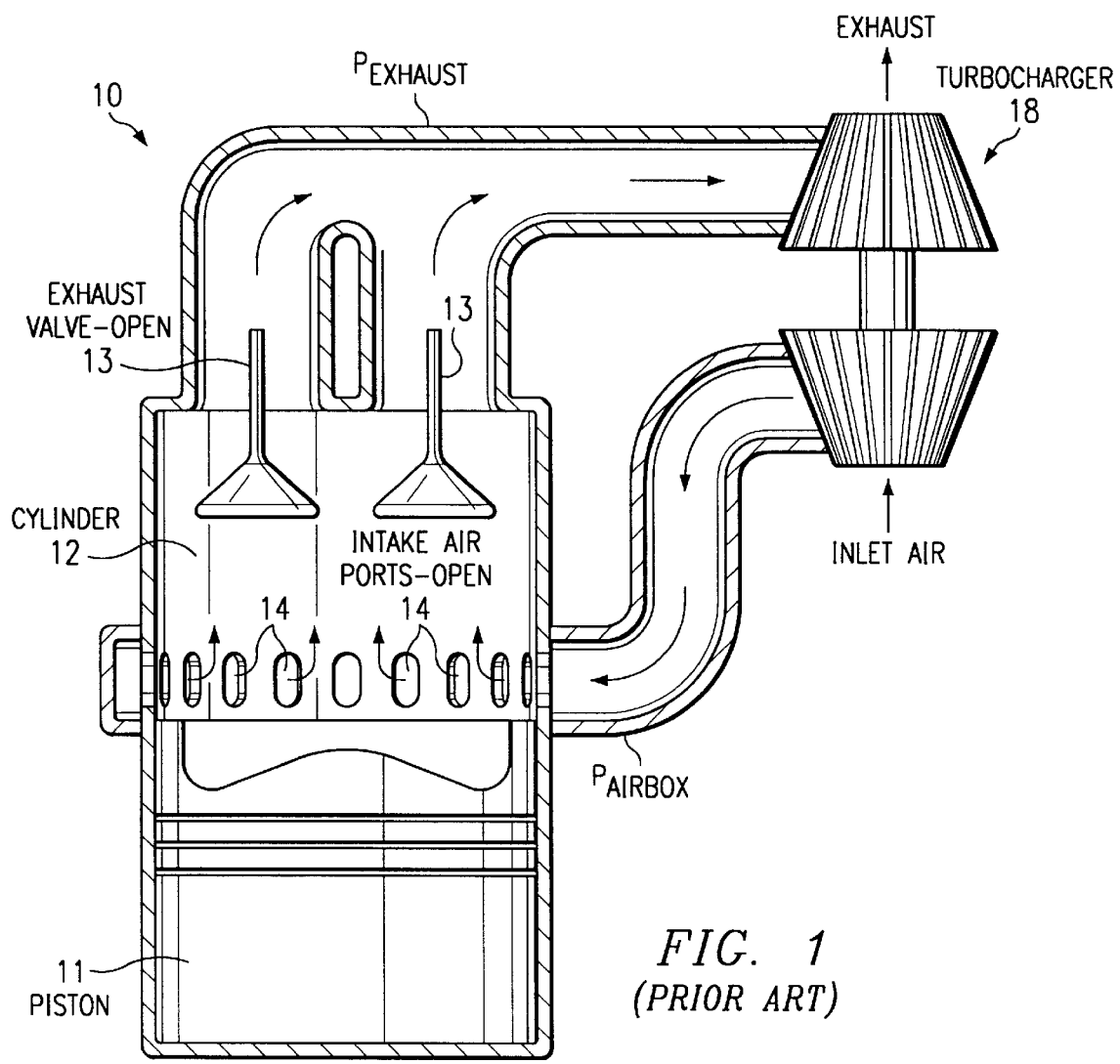
FIGS. 1 and 2 illustrate the operation of a conventional uni-flow scavenged two-cycle engine.
Figure 2:
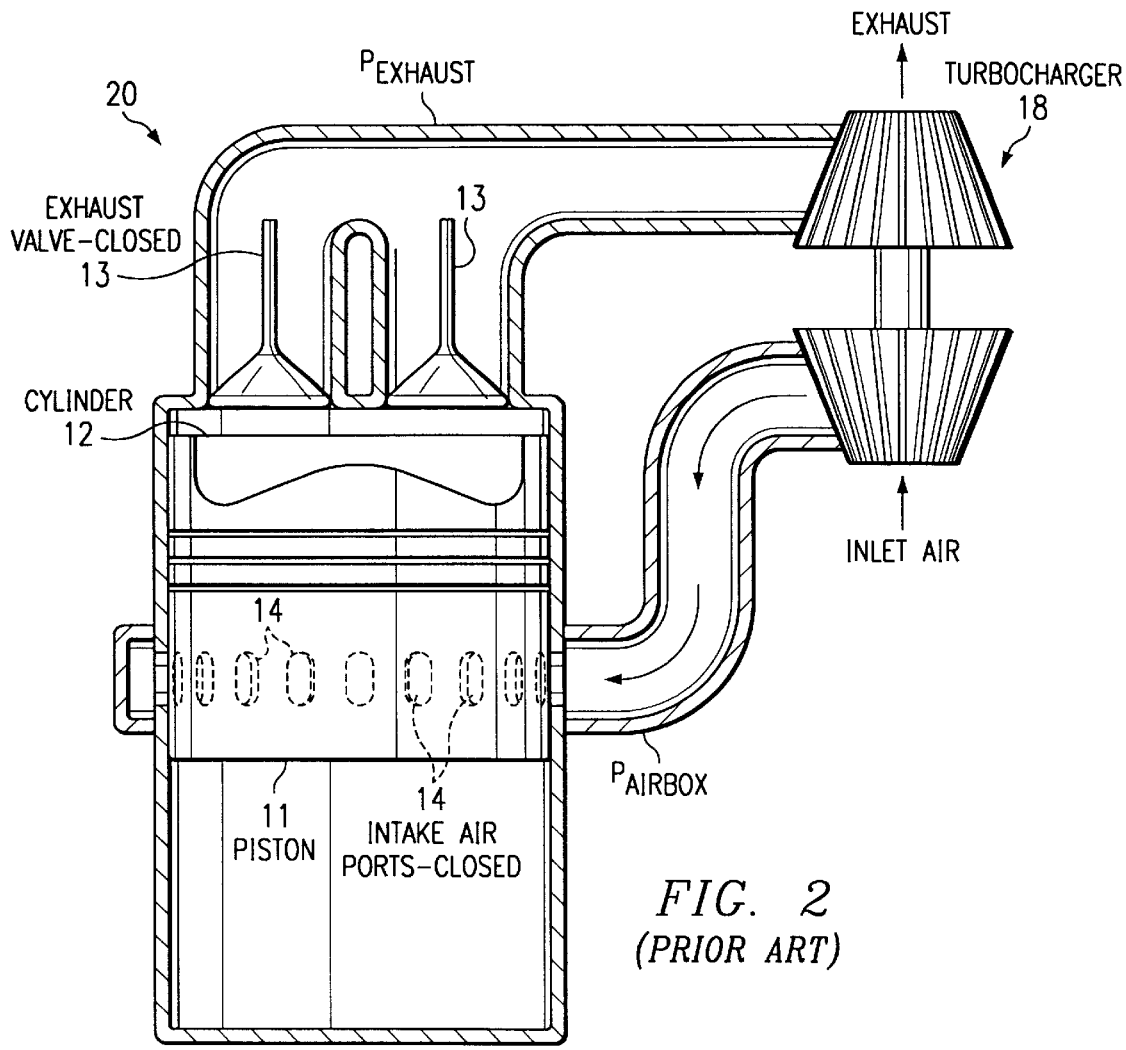

FIGS. 1 and 2 illustrate a uni-flow two-cycle engine 10 in its bottom dead center (BDC) and top dead center (TDC) positions, respectively. For simplicity of illustration, only a single piston 11 and its cylinder 12 are shown. However, in practice a typical engine 10 would have a number of pistons 11 and cylinders 12.

Examples of applications of engine 10 are train locomotives, buses, tugboats, and electric power generators. Typically, engine 10 is a heavy duty engine of this type, but the invention is not limited to engines used in this manner.

As piston 11 moves down on its power stroke, exhaust valves 13 open to let exhaust gases escape from the cylinder 12. Then piston 11 uncovers the air intake 14 ports to permit air to enter the cylinder 12. The intake air is pressurized so that it sweeps-out (scavenges) the exhaust gases from the cylinder 12. As illustrated in FIG. 1, $P_{airbox}$ is greater than $P_{exhaust}$.

On the upward stroke, piston 11 covers intake air ports 14 and then exhaust valves 13 close. At the same time, it compresses the air-fuel mixture for ignition and another power stroke.

As illustrated in FIGS. 1 and 2, engine 10 is "uni-flow" scavenged. Air enters from the bottom of cylinder 12 and exhausts through valves at the top of cylinder 12.

Although not shown in FIGS. 1 and 2, it is assumed that fuel enters cylinder 12 at an appropriate time. The fuel may enter cylinder 12 using any one of a number of techniques, such as by conventional fuel injection. The fuel mixes with the air to provide a desired air/fuel mixture. The fuel may be natural gas, gasoline, or any other fuel that is spark-ignited. The air and fuel in cylinder 12 are uniformly mixed, that is, engine 10 is "homogeneous charged". Engine 10 could also be a dual-fuel type engine, and could use diesel or other ignition rather than spark ignition.

Engine 10 is a turbocharged engine, having a turbocharger 18 that uses exhaust gas energy to boost intake air pressure. Turbocharger 18 is a conventional turbocharging device having an exhaust gas driven turbine that generates drive power for a compressor that boosts pressure to the intake air ports.

The point at which there is a minimum mass of trapped air is governed by the exhaust back pressure and the point at which the exhaust valves close. A feature of the invention is the recognition that these factors, exhaust valve closure and exhaust back pressure, may be controlled to minimize trapped air. This minimizing of trapped air permits fuel to be minimized and power to be reduced. In other words, the engine may run at reduced loads.

Figure 3:
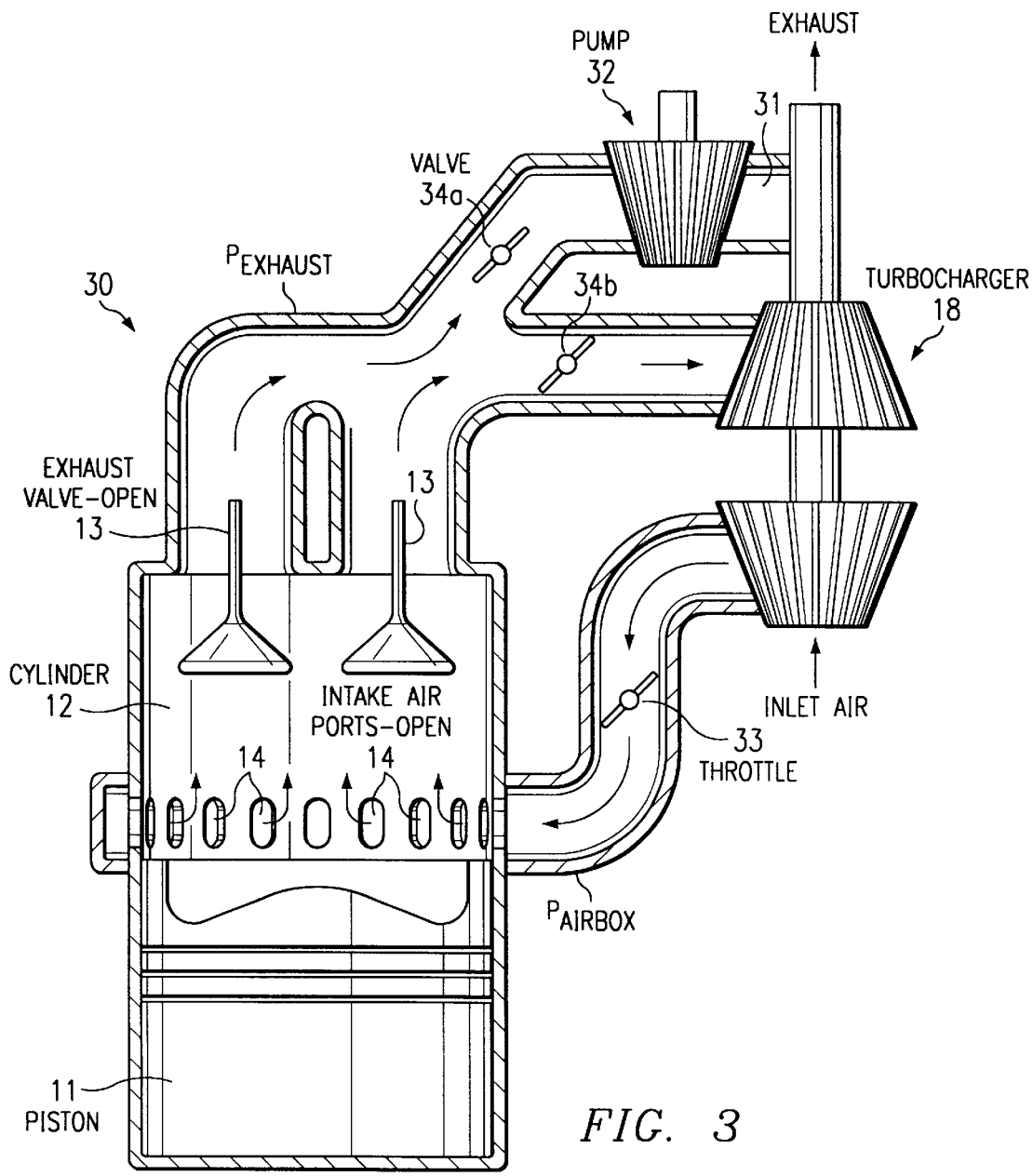
FIG. 3 illustrates a turbocharged engine modified in accordance with the invention.

FIG. 3 illustrates engine 30, which is similar to engine 10 but modified in accordance with the invention. As in FIG. 1, FIG. 3 illustrates the BDC position of piston 11.

Engine 30 has a bypass conduit 31 which permits exhaust gases to be bypassed around turbocharger 18. Valves 34a and 34b control whether exhaust gases are routed through bypass conduit 31 or through turbocharger 18.

An exhaust evacuation pump 32 is situated in bypass conduit 31. As explained below, it is activated at appropriate times to reduce pressure within the exhaust system. An example of a suitable pump 32 is a positive displacement pump. Pump 32 could be driven electrically or mechanically. As examples, pump 32 could be driven by means of the crank shaft, or alternatively, an electric motor could be used.

A throttle 33 controls the amount of air that is received into engine 30 through intake ports 14. Throttle 33 may be a conventional operator-controlled lever or pad or may be electronically controlled.

Pump 32 is activated during light load conditions. Thus, when power is to be reduced, as indicated by throttling, valve 34a opens and valve 34b closes. Air exiting from cylinder 12 enters bypass conduit 31 instead of being routed through turbocharger 18. Evacuation pump 32 is activated to pump air out from the exhaust system.

Figure 4:
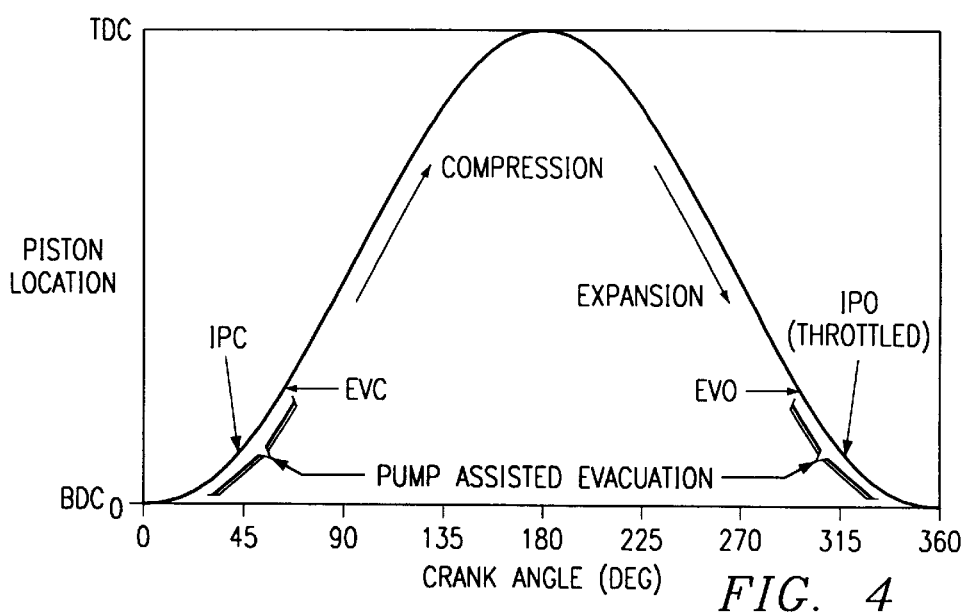
FIG. 4 illustrates how air throttling and exhaust evacuation are performed in accordance with the invention.

FIG. 4 illustrates the piston cycle during light load conditions. During these conditions and during the time that the air intake valves are open, pump 32 creates a vacuum within the air intake system downstream of throttle 33. As illustrated, when the intake air ports 14 are closed, pump 32 continues to evacuate air from cylinder 12 until the exhaust valves 13 are closed. When the exhaust valves 13 are closed, the air inside cylinder 12 is minimized in response to the throttling.

As a result of the reduced air mass in cylinder 12, fuel can be reduced. Homogeneous spark-ignited charging can occur without exceeding the lean limit of combustion.

Control means for valves 34a and 34b as well as for activating pump 32 may be mechanical or electrical. For example, where pump 32 is crank shaft driven, operation of throttle 33 might disengage a clutch such that pump 32 is activated. A conventional or electronic engine governor, which monitors load conditions, could activate pump 32 and valves 34a and 34b when the engine load is reduced to a certain level. Or the activation could be processor controlled. The timing of pump 32 and valves 34a and 34b can be experimentally determined or modeled to turn on and off at optimum conditions.

Once activated for light conditions, pump 32 may run continuously for so long as the light load conditions continue. Alternatively, pump 32 may be synchronized with the operation of the piston stroke. For example, pump 32 may be turned on when the exhaust values are open and off when they are closed.

Figure 5:
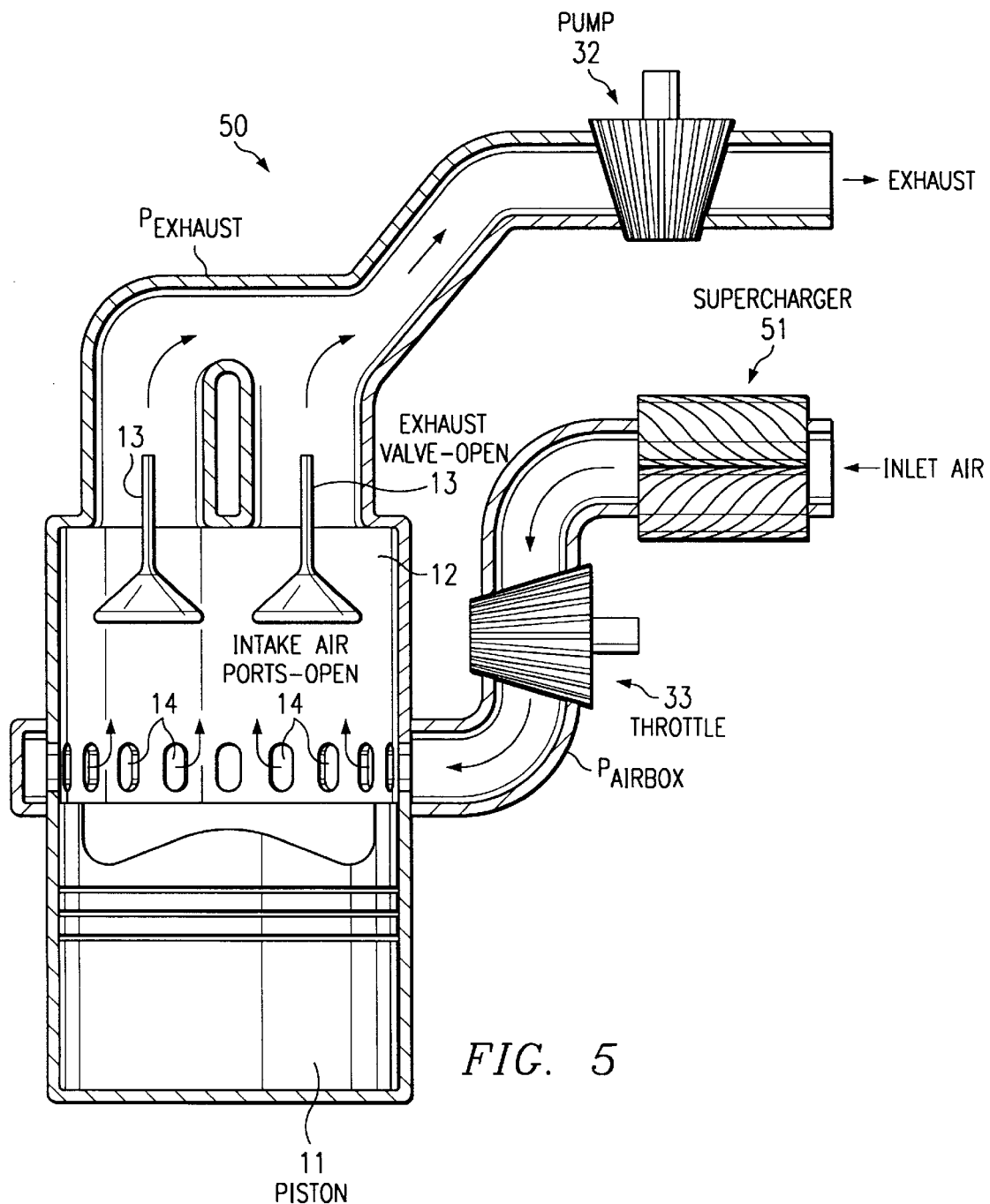
FIG. 5 illustrates a supercharged engine modified in accordance with the invention.

FIG. 5 illustrates engine 50, which has a supercharger 51 rather than a turbocharger, but is modified in accordance with the invention. In the case of engine 50, there is no bypass conduit. Under low load conditions, pump 32 and throttle 33 would be operated in the same manner as described above. Supercharger 51 would be inactivated. When engine 50 is not operating under low load conditions, supercharger 51 would operate normally and exhaust would flow from the exhaust system unaided by pump 32.

In FIG. 5, a turbine-type throttle 33 is used. This is an alternative to the simple throttle 33 used in the embodiment of FIG. 3. Either type of throttle could be used with either embodiment. An advantage of implementing throttle 33 in this manner is that it recovers some of the energy lost in throttling as well as partially offsets the power requirements for evacuation pump 32. Thus, the energy generated by turbine throttle 33 could drive an electrical generator or used mechanically. For example, turbine throttle 33 may be used to assist the driving mechanism for evacuation pump 32.

Other Embodiments

Although the present invention has been described in detail, it should be understood that various changes, substitutions, and alterations can be made hereto without departing from the spirit and scope of the invention as defined by the appended claims.

What is claimed is:

1. A method of operating a uni-flow two-cycle internal combustion engine at reduced loads, said engine having one or more reciprocating pistons in cylinders, comprising the steps of:

on the down stroke of said pistons, first opening exhaust valves associated with said pistons and then opening intake air ports associated with said pistons;

throttling the air intake into said air intake ports;

on the up stroke of said pistons, first closing said intake air ports and then closing said exhaust valves;

determining the existence of reduced load conditions of said engine; and in response to the determining step, evacuating exhaust from said cylinders via said exhaust valves after said exhaust valves are opened during said down stroke, by means of a pump downstream from said exhaust valves, such that air pressure downstream from said exhaust valves is reduced, thereby providing a reduced air mass in said cylinder after said intake valves close.

2. The method of claim 1, further comprising the step of bypassing a turbocharger of said engine during said evacuating step.

3. The method of claim 1, further comprising the step of inactivating a supercharger of said engine during said evacuating step.

4. The method of claim 1, wherein said pump is turned on and off, synchronous with the operation of said pistons.

5. The method of claim 1, wherein said pump is driven by the crankshaft of said engine.

6. The method of claim 5, further comprising means for engaging and disengaging said pump from said crankshaft during operation of said engine.

7. The method of claim 1, wherein said throttling step is performed with a turbine type throttle.

8. The method of claim 7, wherein energy generated by said turbine type throttle is used to aid in said evacuating step.

9. The method of claim 1, wherein said evacuating step begins when said exhaust valves are open and ends when said exhaust valves are closed.

10. The method of claim 1, wherein said pump is driven mechanically.

11. The method of claim 1, wherein said pump is driven electrically.

12. The method of claim 1, wherein said evacuating step creates a negative air pressure in the exhaust system and in the intake air system of said engine during the time that both said exhaust valves and said intake air ports are open.

13. The method of claim 1, wherein said pump runs continuously during light load conditions.

14. The method of claim 1, wherein the determining step is performed mechanically.

15. The method of claim 14, wherein the determining step is a mechanical response to throttle operation.

16. The method of claim 1, wherein the determining step is performed electronically.

17. The method of claim 16, wherein the determining step is an electrical response to an engine governor.

18. The method of claim 16, wherein the determining step is an electrical response to a processor.

* * * * *

UNITED STATES PATENT AND TRADEMARK OFFICE
CERTIFICATE OF CORRECTION

PATENT NO.      : 6,062,178                                    Page 1 of 1
DATED           : May 16, 2000
INVENTOR(S)     : Meyers et al.

It is certified that error appears in the above-identified patent and that said Letters Patent is hereby corrected as shown below:

Column 1,
Line 4, please insert the following governmental rights clause:

-- This invention was made with government support under Contract No. DE-FG36-93CH10582 awarded by United States Department of Energy. The United States Government has certain rights in this invention. --

Signed and Sealed this

Sixteenth Day of September, 2003

JAMES E. ROGAN
*Director of the United States Patent and Trademark Office*